(12) United States Patent
Cheng et al.

(10) Patent No.: US 7,667,639 B2
(45) Date of Patent: Feb. 23, 2010

(54) PASSIVE CHANNEL CALIBRATION METHOD BASED ON NON-LINEAR ANTENNA ARRAY

(76) Inventors: Feng Cheng, School of Electronic Information, Wuhan University, Wuhan (CN) 430072; Xiongbin Wu, School of Electronic Information, Wuhan University, Wuhan (CN) 430072

( * ) Notice: Subject to any disclaimer, the term of this patent is extended or adjusted under 35 U.S.C. 154(b) by 129 days.

(21) Appl. No.: 11/859,746

(22) Filed: Sep. 22, 2007

(65) Prior Publication Data

US 2008/0012753 A1    Jan. 17, 2008

Related U.S. Application Data

(63) Continuation of application No. PCT/CN2006/000453, filed on Mar. 21, 2006.

(30) Foreign Application Priority Data

Mar. 24, 2005    (CN) .................. 2005 1 0018438

(51) Int. Cl.
  *G01S 7/40*    (2006.01)
(52) U.S. Cl. .................. 342/174; 342/165; 342/173
(58) Field of Classification Search .................. 342/165, 342/173, 174
  See application file for complete search history.

(56) References Cited

U.S. PATENT DOCUMENTS 5,361,072 A * 11/1994 Barrick et al. .............. 342/133

OTHER PUBLICATIONS

Ship detection and tracking using high frequency surface wave radar Blake, T.M.; HF Radio Systems and Techniques, Seventh International Conference on (Conf. Publ. No. 441) Jul. 7-10, 1997 pp. 291-295.*
Target detection with high frequency surface wave radar in co-channel interference Xianrong et al, IEEE Proceeding Radar Sonar Navigation vol. 152 No. 2 Apr. 2005 p. 97-103.*
Robust adaptive beamforming using worst-case performance optimization: a solution to the signal mismatch problem Vorobyov, S.A.; Gershman, A.B.; Zhi-Quan Luo; Signal Processing, IEEE Transactions on [see also Acoustics, Speech, and Signal Processing, IEEE Transactions on] vol. 51, Issue 2, Feb. 2003 pp. 313-324.*
Adaptive suppression of skywave interference in HF surface wave radar using auxiliary horizontal dipole antennas Leong, H.W.H.; Communications, Computers and Signal Processing, 1999 IEEE Pacific Rim Conference on Aug. 22-24, 1999 pp. 128-132.*

(Continued)

*Primary Examiner*—Thomas H Tarcza
*Assistant Examiner*—Peter M Bythrow
(74) *Attorney, Agent, or Firm*—Matthias Scholl P.C.; Matthias Scholl

(57) ABSTRACT

Taught herein is a passive channel calibration method wherein a non-linear antenna array sets an antenna array to a non-linear formation that contains at least a combination of translation invariant dual array-element couples, detects single-azimuth ocean echoes via combinations of translation invariant dual array-element couples, estimates channel amplitude mismatch coefficients via the single-azimuth ocean echoes to implement amplitude calibration, and estimates channel phase mismatch coefficients via the single-azimuth ocean echoes after amplitude calibration and the known array position information to implement phase calibration.

20 Claims, 4 Drawing Sheets

OTHER PUBLICATIONS

Smart antenna array calibration procedure including amplitude and phase mismatch and mutual coupling effects Dandekar, K.R.; Hao Ling; Guanghan Xu; Personal Wireless Communications, 2000 IEEE International Conference on Dec. 17-20, 2000 pp. 293-297.*

Least-squares methods for the extraction of surface currents from CODAR crossed-loop data: Application at Arsloe Lipa, B. Barrick, D. Ocean Surface es. Inc., Woodside, CA, USA;This paper appears in: Oceanic Engineering, IEEE Journal of Publication Date: Oct. 1983 vol. 8, Issue: 4 On pp. 226-253.*

Extraction of sea state from HF radar sea echo: mathematical theory and modeling Lipa, Barrick, Radio Science, Wol 21 No. 1, pp. 81-100 Jan.-Feb. 1986.*

* cited by examiner

US 7,667,639 B2

PASSIVE CHANNEL CALIBRATION METHOD BASED ON NON-LINEAR ANTENNA ARRAY

CROSS-REFERENCE TO RELATED APPLICATIONS

This application is a continuation of International Patent Application No. PCT/CN2006/000453 with an international filing date of Mar. 21, 2006, designating the United States, now pending, and further claims priority benefits to Chinese Patent Application No. 200510018438.3 filed Mar. 24, 2005, the contents of which are incorporated herein by reference.

BACKGROUND OF THE INVENTION

1. Field of the Invention

The invention relates to a passive channel calibration method for a high frequency surface wave radar (HFSWR) by a non-linear antenna array.

2. Description of the Related Art

High frequency surface wave radar uses the characteristic of vertically-polarized high frequency electromagnetic wave whose attenuation is low when it transmits along the ocean surface. It has the capability of over-the-horizon detection of the targets below the line of sight, such as vessels, low-altitude planes, missiles and so on. In addition, HFSWR can extract the ocean state information (wind field, wave field, current field, etc.) from the first order and the second order radar ocean echoes. Then the real time monitoring of large-scope, high-precision and all-weather to the ocean can be achieved.

Influenced by multiple factors, such as difference in hardware, non-ideal characteristic of receiving channels and surrounding electromagnetic environment, amplitude-phase characteristics of each of the radar channels including antenna are different, which causes inconsistency between the amplitude and phase values of the same echo signal passing through different channels, which is referred to as channel mismatch. The channel mismatch may increase errors of, or even invalidate beam scan and direction-of-arrival estimation. The channel mismatch is a key point that affects detecting performance of HFSWR. Steps must be taken to restrict the channel mismatch within a given range to ensure operating efficiently of the radar: firstly, proper measurements should be taken (e.g. component selection) to ensure consistency of each channel during production thereof; secondly, the channel mismatch coefficients can be measured or estimated, and characteristic difference between channels is further reduced via calibration.

Existing channel calibration methods can be categorized into active ones and passive ones. In the active calibration method, the auxiliary signal source is located in an open area far away from the antenna array to send calibration signals, and the output of each receiving channel is measured; then, channel mismatch information can be obtained by deducting the phase difference caused by azimuth of known signal source and array space position. In the passive calibration method, no auxiliary signal source whose azimuth has been accurately obtained is needed, the channel mismatch coefficients are estimated directly via the received measuring data and some apriority information (e.g. array format), and compensative calibration methods is implemented. There are other passive calibration methods that can realize joint estimation of signal azimuth and channel mismatch. Detailed description of the passive calibration method can be found in the book "Spatial Spectrum Estimation and its Applications" (Press of China University of Science and Technology, 1997) by Liu D S and Luo J Q.

Influenced by many factors, such as landform condition, operating wavelength, electromagnetic wave propagation, radar system, antenna array, (solid) target echoes, ocean echoes, noise interference, it is difficult to implement channel calibration for HFSWRs. The prior art can only partly solve the problems, and is time-consuming and expensive. Sea surface is in front of the radar antenna array, so if the active calibration is adopted, the auxiliary signal source can only be located on a ship or an island, which will be troublesome and expensive to maintain and difficult to work steadily. Existing passive calibration methods need complicated iterative computing, which means a heavy computing load and may not meet a real-time requirement, and even have a possibility of converging to the local optimum, not the global one, which may result in completely inaccurate estimated values. Applicable conditions of the existing passive calibration method cannot be satisfied due to the difference between an actual radar system and an ideal model. The channel calibration has become a big technical problem that restricts detecting performance of HFSWR and affects actual application thereof, and must be solved properly.

The Radio Wave Propagation Lab of Wuhan University has considered using the reflection signal of a known natural or artificial object on the ocean as a calibration signal. The calibration signal can be detected from echoes if the range and the velocity of a reflection source are already known, and mismatch coefficients of each channel are estimated based on the azimuth of the reflection source. Detailed description can be found in Chinese Patent Application No. 03128238.5 entitled "A method for array channel calibration using ocean echoes". The invention may utilize echoes from fixed reflection objects such as islands, lighthouses, drilling platforms and so on, which overcome problems such as displacement and maintenance of auxiliary signal sources and extra hardware cost, and online real time automatic calibration may be implemented. However, the invention is not suitable to a sea area without fixed reflection objects, and is affected by disadvantageous factors such as noise interference, ship echoes, multi-path effect and so on. As that invention proposes a technology for separating and detecting the ocean echoes with single azimuths, whose frequency spectrums are non-overlapped, which meets basic requirements of the passive channel calibration method of this invention, and will be described in further detail below.

HFSWR commonly adopts a frequency modulated interrupted continuous wave (FMICW) waveform, which has been explained in detail in the paper "Target Detection and Tracking With a High Frequency Surface wave Radar" (Rafaat Khan, et al., IEEE Journal of Oceanic Engineering, 1994, 19(4): 540-548). By the waveform, a range-Doppler (velocity) two-dimension echo spectrum can be obtained by mixing, low-pass filtering, A/D converting and two dimension FFT (shown as FIG. 1) after the ocean echoes (including those from ocean surface waves and from solid targets) enter a receiver (as shown in FIG. 2). In the two-dimension echo spectrum, the ocean echoes are separated according to the range and the velocity, and distributed on many spectrum points. If coherence accumulation time of the second FFT (Doppler transformation) is rather long (about 10 minutes), the radar may obtain very high velocity resolution, which means the number of the spectrum points in the two-dimension echo spectrum corresponding to the ocean echoes may be above 1000, and it is suitable to detect the single-azimuth echoes whose frequency spectrums are non-overlapped via a statistical method.

Detection of the single-azimuth echoes is implemented by statistical analysis of a two-dimension echo spectrum of an array in a given form (as shown in FIG. 3). The array in a particular form is composed of array elements 1-4, whose position coordinates thereof is ($x_i$, $y_i$), and the output of a corresponding two-dimension echo spectrum point is $Y_i$, i=1, 2, 3, 4. An array-element couple $A_1$ is composed of elements 1 and 2, and the other array-element couple $A_2$ is composed of elements 3 and 4. There is translation invariance between $A_1$ and $A_2$, then $$\begin{cases} (x_2, y_2) = (x_1 + d, y_1) \\ (x_4, y_4) = (x_3 + d, y_3) \end{cases}$$

Defining $\eta_1 = \frac{Y_2 Y_3}{Y_1 Y_4}$.

It is easy to prove that, in an ideal condition without noise, $\eta_1$ corresponding to a single-azimuth spectrum point in the two-dimension echo spectrum is an invariable parameter, which only relates to channel mismatch and is marked as $\eta'_1$. In an actual system, the noise is inevitable, so $\eta_1$ corresponding to the single-azimuth spectrum points are centrally distributed around $\eta_1$. On the other hand, it can be known from simple analysis and numerical modeling that $\eta_1$ corresponding to a multi-azimuth spectrum point is a variable relating to target parameters of ranges, (radial) velocities, azimuths and echo signal amplitudes, whose randomicity result in a randomly distributed state of $\eta_1$. To summarize, if $\eta_1$ corresponding to spectrum points that exceed a signal-noise-ratio threshold in the two-dimension echo spectrum are marked on the complex plane, it will be found that highly-aggregative phenomena appears in only one region (around $\eta'_1$), where most of $\eta_1$ are corresponding to the single-azimuth spectrum points.

Defining $\eta_2 = \frac{Y_2 Y_1^*}{Y_4 Y_3^*}$, from analysis similar to the above, an aggregative region, where most of $\eta_2$ are corresponding to the single-azimuth spectrum points, may also appear on the complex plane.

Defining $\eta_3 = \frac{Y_2 Y_4^*}{Y_1 Y_3^*}$, an aggregative region, where most of $\eta_3$ are corresponding to the single-azimuth spectrum points, may appear on the complex plane in the same way.

Discovered through theoretic analysis and numerical modeling, the probability that $\eta_1$, $\eta_2$ and $\eta_3$ corresponding to a multi-azimuth spectrum point simultaneously drop into their respective aggregative regions is very small, and therefore whether $\eta_1$, $\eta_2$ and $\eta_3$ simultaneously drop into their respective aggregative regions can be used as a criterion to detect single-azimuth spectrum points. As a combination of translation invariant dual array-element couples, $A_1$ and $A_2$ compose an array in a given form for detecting single-azimuth echoes (spectrum points). If there is more than one combination of translation invariant dual array-element couples in the array, the single-azimuth spectrum points can be filtered out by a criterion whether a spectrum point is detected by multiple combinations of translation invariant dual array-element couples. An array containing at least a combination of translation invariant dual array-element couples, such as a uniform linear array (or a uniform plane array), is very common.

SUMMARY OF THE INVENTION

To overcome deficiencies of the prior art, an object of the invention is to provide a passive channel calibration method based on a non-linear antenna array using single-azimuth ocean echoes received by HFSWR, to reduce channel amplitude-phase mismatch and improve system performance. The non-linear antenna array is an array whose elements do not lie on the same straight line.

To achieve the above object, in accordance with one embodiment of the invention, provided is a passive channel calibration method based on a non-linear antenna array, comprising setting an antenna array to a non-linear formation that contains at least a combination of translation invariant dual array-element couples; detecting single-azimuth ocean echoes via combinations of translation invariant dual array-element couples; estimating channel amplitude mismatch coefficients via the single-azimuth ocean echoes to implement amplitude calibration; and estimating channel phase mismatch coefficients via the single-azimuth ocean echoes after amplitude calibration and the known array position information to implement phase calibration.

In the above method, the channel amplitude mismatch coefficients are estimated by the single-azimuth ocean echoes using a equation $$\hat{g}_i = \sqrt{\sum_{l=1}^{L} |Y_i(l)|^2 \Big/ \sum_{l=1}^{L} |Y_1(l)|^2} ,$$

where $\hat{g}_i$ being an estimated value of the channel amplitude mismatch coefficient of array element i, i=1, 2, ..., M; M being the number of array elements; $Y_i(l)$ being the output of the lth single-azimuth echo received by array element i, l=1, 2, ..., L; and L being the number of single-azimuth echoes.

In another embodiment, the channel amplitude mismatch coefficients are estimated by the single-azimuth ocean echoes using a equation $$\hat{g}_i = \sqrt{\frac{1}{L}\sum_{l=1}^{L} \frac{|Y_i(l)|^2}{|Y_1(l)|^2}} ,$$

where ĝhd i being an estimated value of the channel amplitude mismatch coefficient of array element i, i=1, 2, ..., M; M being the number of array elements; $Y_i(l)$ being the output of the lth single-azimuth echo received by array element i, l=1, 2, ..., L; and L being the number of single-azimuth echoes.

In another embodiment, the channel amplitude mismatch coefficients are estimated by the single-azimuth ocean echoes using a equation $$\hat{g}_i = \sum_{l=1}^{L} |Y_i(l)| \Big/ \sum_{l=1}^{L} |Y_1(l)|,$$

where $\hat{g}_i$ being an estimated value of the channel amplitude mismatch coefficient of array element i, i=1, 2, ..., M; M being the number of array elements; $Y_i(l)$ being the output of the lth single-azimuth echo received by array element i, l=1, 2, ..., L; and L being the number of single-azimuth echoes.

In another embodiment, the channel amplitude mismatch coefficients are estimated by the single-azimuth ocean echoes using a equation $$\hat{g}_i = \frac{1}{L} \sum_{l=1}^{L} \frac{|Y_i(l)|}{|Y_1(l)|},$$

where $\hat{g}_i$ being an estimated value of the channel amplitude mismatch coefficient of array element i, i=1, 2, ..., M; M being the number of array elements; $Y_i(l)$ being the output of the lth single-azimuth echo received by array element i, l=1, 2, ..., L; and L being the number of single-azimuth echoes.

In the invention, the channel phase mismatch coefficients are estimated by the single-azimuth ocean echoes after amplitude calibration and the known array position information from $$\hat{\Psi} = \arg\min_{\Psi} \|Y - f'(\Psi)\|^2,$$

where $$\Psi = [\theta_1, \theta_2, \ldots, \theta_L, \phi_2, \phi_3, \ldots, \phi_M]^T$$

$$Y = \begin{bmatrix} Y_2 \\ Y_3 \\ \vdots \\ Y_M \end{bmatrix}$$

$$Y_i = [Y_i(1), Y_i(2), \ldots, Y_i(L)]^T$$

$$f'(\Psi) = \begin{bmatrix} f_2'(\Psi) \\ f_3'(\Psi) \\ \vdots \\ f_M'(\Psi) \end{bmatrix}$$

$$f_i'(\Psi) = \begin{bmatrix} Y_1(1)e^{j[\frac{2\pi}{\lambda}(x_i\sin\theta_1 + y_i\cos\theta_1) + \phi_i]}, \\ Y_1(2)e^{j[\frac{2\pi}{\lambda}(x_i\sin\theta_2 + y_i\cos\theta_2) + \phi_i]}, \ldots, \\ Y_1(L)e^{j[\frac{2\pi}{\lambda}(x_i\sin\theta_L + y_i\cos\theta_L) + \phi_i]} \end{bmatrix}^T$$

$\theta_l$ being the arrival angle of the lth single-azimuth echo; $\Phi_i$ being the channel phase mismatch coefficient of array element i; $(x_i, y_i)$ being the array element position coordinates, and array element 1 is the origin of coordinates, i.e. $(x_1, y_1)=(0,0)$; $\lambda$ being the echo signal wavelength; $\hat{\Psi}$ being the estimated value of $\Psi$.

In another embodiment, the channel phase mismatch coefficients are estimated via the single-azimuth ocean echoes after amplitude calibration and the known array position information from $$\hat{\Psi} = \arg\min_{\Psi} \|Y - \tilde{f}(\Psi)\|^2,$$

where $$\Psi = [\theta_1, \theta_2, \ldots, \theta_L, \phi_2, \phi_3, \ldots, \phi_M]^T$$

$$Y = \begin{bmatrix} Y_2 \\ Y_3 \\ \vdots \\ Y_M \end{bmatrix}$$

$$Y_i = [Y_i(1), Y_i(2), \ldots, Y_i(L)]^T$$

$$\tilde{f}(\Psi) = \begin{bmatrix} \tilde{f}_2(\Psi) \\ \tilde{f}_3(\Psi) \\ \vdots \\ \tilde{f}_M(\Psi) \end{bmatrix}$$

$$\tilde{f}_i(\Psi) = \begin{bmatrix} \hat{A}(1)e^{j[\frac{2\pi}{\lambda}(x_i\sin\theta_1 + y_i\cos\theta_1) + \phi_i]}, \\ \hat{A}(2)e^{j[\frac{2\pi}{\lambda}(x_i\sin\theta_2 + y_i\cos\theta_2) + \phi_i]}, \ldots, \\ \hat{A}(L)e^{j[\frac{2\pi}{\lambda}(x_i\sin\theta_L + y_i\cos\theta_L) + \phi_i]} \end{bmatrix}^T$$

$$\hat{A}(l) = \frac{1}{M} \sum_{i=1}^{M} Y_i(l) e^{-j[\frac{2\pi}{\lambda}(x_i\sin\theta_l + y_i\cos\theta_l) + \phi_i]}$$

$$= \frac{1}{M} \left\{ \sum_{i=2}^{M} Y_i(l) e^{-j[\frac{2\pi}{\lambda}(x_i\sin\theta_l + y_i\cos\theta_l) + \phi_i]} + Y_1(l) \right\}$$

$\theta_l$ being the arrival angle of the lth single-azimuth echo; $\Phi_i$ being the channel phase mismatch coefficient of array element i; $(x_i, y_i)$ being the array element position coordinates, and array element 1 is the origin of coordinates, i.e. $(x_1, y_1)=(0,0)$; $\lambda$ being the echo signal wavelength; $\hat{\Psi}$ being the estimated value of $\Psi$.

In accordance with the invention, three array elements are selected from all array elements to form a triangular array, which is utilized by the processes to decrease the dimension number of global optimization, and the channel phase mismatch coefficients are estimated via pre-estimation of initial values and local optimization methods, so as to reduce the computing load of multi-parameter estimation.

1) Selecting three array elements to form a triangular array, along with three single-azimuth echoes for parameter estimation; 2) choosing any element of the triangular array as a reference channel and estimating the phase mismatch coefficients of other two channels and the arrival angles of three single-azimuth echoes via global optimization methods; 3) adding a single-azimuth echo for parameter estimation of the triangular array, and thus obtaining its arrival angle; 4) obtaining arrival angles of other single-azimuth echoes according to step 3); 5) combining the triangular array with another array element to form a 4-element array, and using all single-azimuth echoes for parameter estimation of the 4-element array, so as to obtain the channel phase mismatch coefficient of the newly-added array element; and 6) obtaining channel phase mismatch coefficients of other array elements according to step 5).

According to the invention, after step 4), using all single-azimuth echoes for parameter estimation of the triangular array, and regarding the obtained estimated values of the arrival angles of single-azimuth echoes and the channel phase mismatch coefficients as initial values, more accurate estimated values of these parameters are obtained via local optimization methods, then the following step 5) and 6) are performed.

After step 6), using all single-azimuth echoes for parameter estimation of the whole array, and regarding the obtained estimated values of the arrival angles of single-azimuth echoes and the channel phase mismatch coefficients as initial values, more accurate estimated values of these parameters are obtained via local optimization methods.

For an M-element L-form array, the array elements 1, 2, M are used for parameter estimation as a triangular array selected in step 1), so as to implement channel phase calibration.

For a 4-element T-form array, array element 1, 2, 4 or array element 2, 3, 4 are used for parameter estimation as a triangular array selected in step 1), so as to implement channel phase calibration.

For a 4-element rectangular array, any three array elements are used for parameter estimation as a triangular array selected in step 1), so as to implement channel phase calibration.

The invention has the advantage of excellent practicability: it has no use for any auxiliary signal source and so is a genuine passive channel calibration method. The invention only utilizes the single-azimuth echoes, therefore the troublesome problems encountered by active channel calibration methods, such as ship echo interference, multi-path effect and so on do not exist; utilizing a great number (may more than 100) of high strength single-azimuth ocean echoes, and so having a high information utilization ratio that leads to good precision and steadiness; employing special processes to reduce computing load, therefore can meet the real-time requirement; being able to operate stably without stopping for a long time as the ocean echoes always exist largely; greatly improving the application flexibility of HFSWRs, hence whose antenna systems can be replaced, increased/decreased or moved freely, which is hard to achieve in the past; improving detection performance, as well as greatly reducing development and maintenance costs.

DETAILED DESCRIPTION OF THE INVENTION

A key point of the invention is to build a single-azimuth echo signal model received by a non-linear antenna array, to transfer a channel calibration problem to a parameter estimation problem, and to obtain comparatively accurate channel mismatch estimation.

Figure 1:
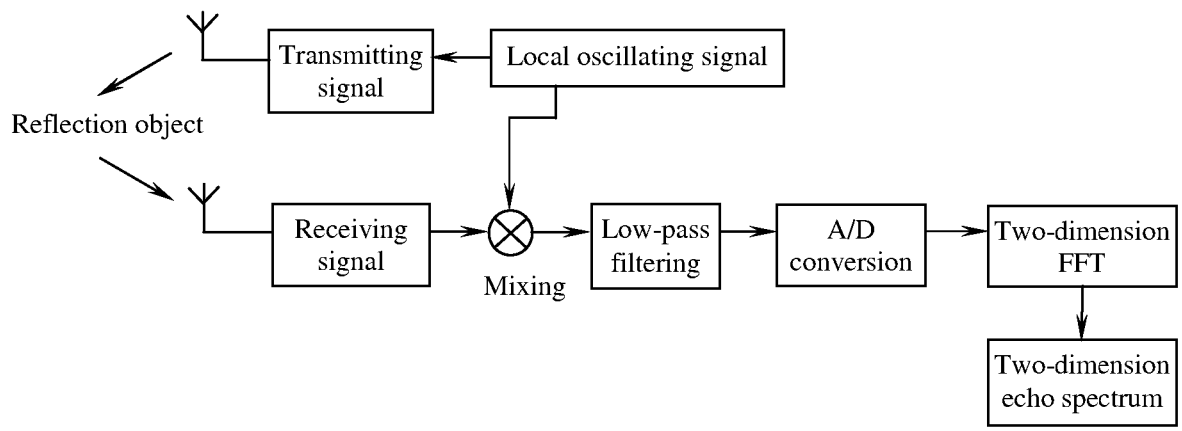
FIG. 1 is a functional diagram of a high frequency surface wave radar.
Figure 2:
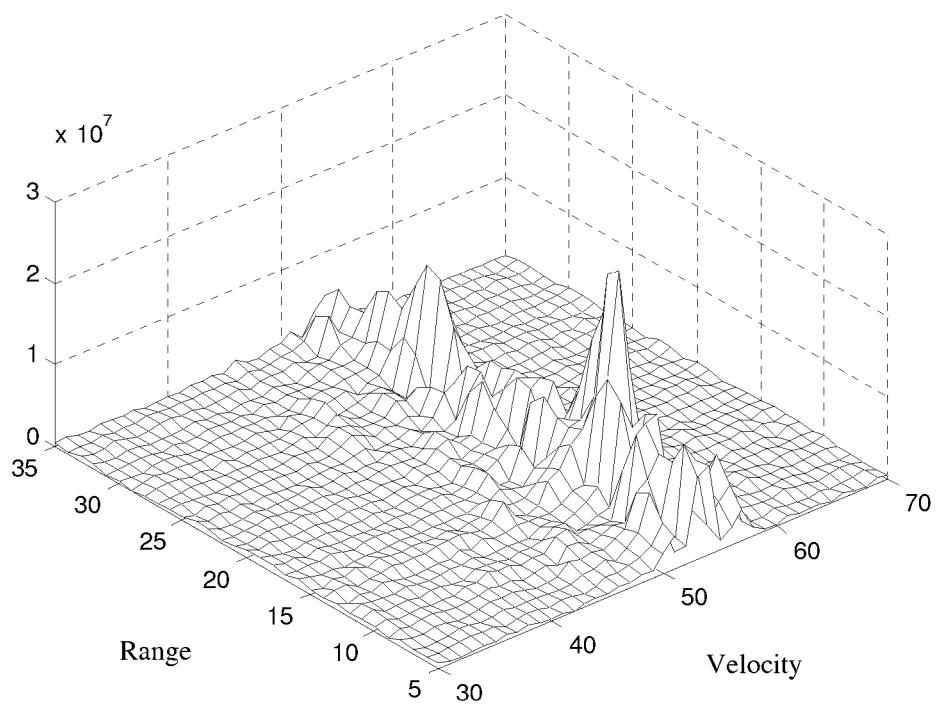
FIG. 2 is a range-Doppler (velocity) two-dimension echo spectrum diagram of a high frequency surface wave radar.
Figure 3:
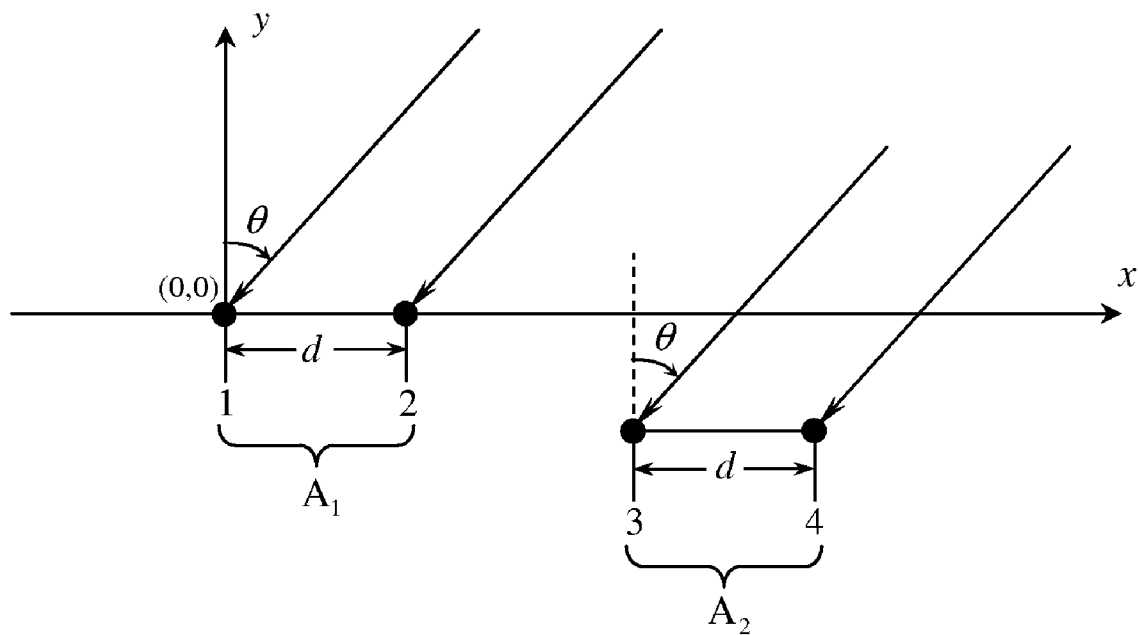
FIG. 3 is a schematic diagram illustrating an array in a given form for detecting single-azimuth echoes.
Figure 4:
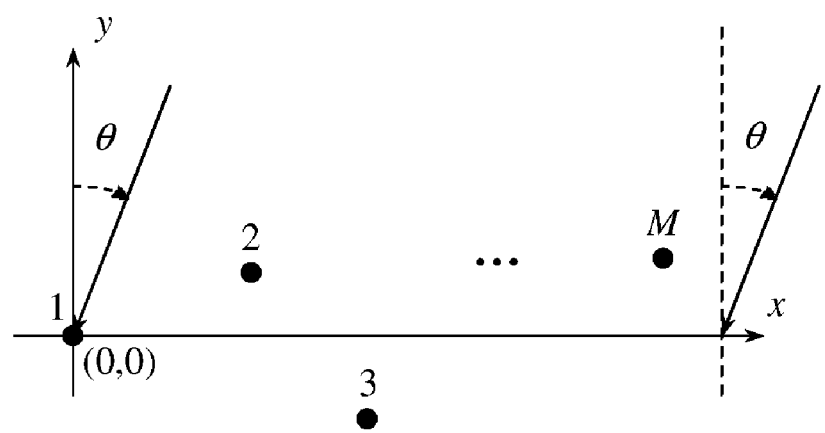
FIG. 4 is a schematic diagram illustrating a M-element random non-linear array of the invention.

First of all, a M-element (M≧3) random non-linear antenna array is shown in FIG. 4, and detailed embodiments in that scenario are describe below:

(A) Signal Model

The array element position coordinates of the non-linear antenna array shown in FIG. 4 are $(x_i, y_i)$ (i=1, 2, ..., M), and array element 1 is the origin of coordinates, i.e. $(x_1, y_1)=(0, 0)$. An ocean echo can be regard as a plane wave. Assuming the number of the single-azimuth echoes detected from the range-Doppler (velocity) two-dimension echo spectrum is L (L≧3), then the output of the lth (l=1, 2, ..., L) single-azimuth echo received by array element i is $$Y_i(l) = g_i e^{j\Phi_i} \left[ A(l) e^{j\frac{2\pi}{\lambda}(x_i \sin\theta_l + y_i \cos\theta_l)} + W_i(l) \right] \quad (1)$$

where $\theta_l$ and $A(l)$ are the arrival angle and the complex amplitude of the lth single-azimuth echo respectively; $g_i$ and $\Phi_i$ are the channel amplitude mismatch coefficient and the channel phase mismatch coefficient of array element i respectively; $\lambda$ is the echo signal wavelength; and $W_i(l)$ is additive noise. Choose array element 1 as a reference channel, i.e., $g_1 e^{j\Phi_1}=1$, it can be deduced from equation (1) that $$Y_1(l) = A(l) + W_1(l) \quad (2)$$

For the additive noise $W_i(l)$, it is assumed that:
1) $W_i(l)$ corresponding to different i or l are independent from each other;
2) $W_i(l)$ are Gauss white noise with the same variance $\sigma^2$.

Then the equation (1) and (2) form a signal model of channel mismatch estimation.

(B) Channel Amplitude Calibration

The channel amplitude mismatch estimation of array element i can be obtained by $$\hat{g}_i = \sqrt{\sum_{l=1}^{L} |Y_i(l)|^2 \Big/ \sum_{l=1}^{L} |Y_1(l)|^2} \quad (3)$$

and then the channel amplitude mismatches can be calibrated by $\hat{g}_i$. The equation (3) has other forms such as $$\hat{g}_i = \sqrt{\frac{1}{L} \sum_{l=1}^{L} \frac{|Y_i(l)|^2}{|Y_1(l)|^2}},$$

$$\hat{g}_i = \sum_{l=1}^{L} |Y_i(l)| \Big/ \sum_{l=1}^{L} |Y_1(l)|,$$

$$\hat{g}_i = \frac{1}{L} \sum_{l=1}^{L} \frac{|Y_i(l)|}{|Y_1(l)|},$$

and so on.

(C) Channel Phase Calibration

After channel amplitude calibration, the output of the lth single-azimuth echo received by array element i is $$Y_i(l) = e^{j\phi_i}\left[A(l)e^{j\frac{2\pi}{\lambda}(x_i\sin\theta_l + y_i\cos\theta_l)} + W_i(l)\right] \quad (4)$$

Defining $$Y_i = [Y_i(1), Y_i(2), \ldots, Y_i(L)]^T \quad i = 2, 3, \ldots, M$$

$$Y = \begin{bmatrix} Y_2 \\ Y_3 \\ \vdots \\ Y_M \end{bmatrix}$$

$$\Psi = [\theta_1, \theta_2, \ldots, \theta_L, \phi_2, \phi_3, \ldots, \phi_M]^T$$

$$f_i(\Psi) = \begin{bmatrix} A(1)e^{j[\frac{2\pi}{\lambda}(x_i\sin\theta_1 + y_i\cos\theta_1)+\phi_i]}, \\ A(2)e^{j[\frac{2\pi}{\lambda}(x_i\sin\theta_2 + y_i\cos\theta_2)+\phi_i]}, \ldots, \\ A(L)e^{j[\frac{2\pi}{\lambda}(x_i\sin\theta_L + y_i\cos\theta_L)+\phi_i]} \end{bmatrix}^T$$

$$f(\Psi) = \begin{bmatrix} f_2(\Psi) \\ f_3(\Psi) \\ \vdots \\ f_M(\Psi) \end{bmatrix}$$

Choosing $\Psi$ as a parameter vector to be estimated and using a maximum likelihood method (referring to the book "Modern Signal Processing" by Zhang X D, Press of Tsinghua University, 1994), according to equation (4) and noise model assumption, an estimated value of $\Psi$ is $$\hat{\Psi} = \arg\min_\Psi\{[Y - f(\Psi)]^H[Y - f(\Psi)]\} = \arg\min_\Psi \|Y - f(\Psi)\|^2 \quad (5)$$

where $$\arg\min_\Psi$$

denotes a value of $\Psi$ as an expression thereafter is minimized, $\|X\|^2$ denotes a 2-norm of a vector X. It is apparent that the channel phase mismatch coefficients and the arrival angles of single-azimuth echoes implement joint estimation.

A(l) cannot be obtained directly since it is contained in $Y_i(l)$ having noise, and $f_i(\Psi)$ cannot be constructed directly, therefore equation (5) cannot actually be used for estimating channel phase mismatchs, and should be improved. In a condition with a common signal to noise ratio ($\geqq 20$ dB), it can be inferred from equation (2) that $Y_1(l) \approx A(l)$; then replacing A(l) in equation (5) with $Y_1(l)$, and an actual expression of the estimated value of $\Psi$ is $$\hat{\Psi} = \arg\min_\Psi \|Y - f'(\Psi)\|^2 \text{ where} \quad (6)$$

-continued $$f'(\Psi) = \begin{bmatrix} f_2'(\Psi) \\ f_3'(\Psi) \\ \vdots \\ f_M'(\Psi) \end{bmatrix}$$

$$f_i'(\Psi) = \begin{bmatrix} Y_1(1)e^{j[\frac{2\pi}{\lambda}(x_i\sin\theta_1 + y_i\cos\theta_1)+\phi_i]}, \\ Y_1(2)e^{j[\frac{2\pi}{\lambda}(x_i\sin\theta_2 + y_i\cos\theta_2)+\phi_i]}, \ldots, \\ Y_1(L)e^{j[\frac{2\pi}{\lambda}(x_i\sin\theta_L + y_i\cos\theta_L)+\phi_i]} \end{bmatrix}^T$$

and then the channel phase mismatches can be calibrated by $\hat\Psi$. If A(l) in equation (5) is replaced by other values, the equation (6) will have other forms, e.g., $$\hat{\Psi} = \arg\min_\Psi \|Y - \tilde{f}(\Psi)\|^2,$$

where Y and $\Psi$ have the same definition as above, and $\tilde f(\Psi)$ is defined as $$\tilde f(\Psi) = \begin{bmatrix} \tilde f_2(\Psi) \\ \tilde f_3(\Psi) \\ \vdots \\ \tilde f_M(\Psi) \end{bmatrix}$$

$$\tilde f_i(\Psi) = \begin{bmatrix} \hat A(1)e^{j[\frac{2\pi}{\lambda}(x_i\sin\theta_1 + y_i\cos\theta_1)+\phi_i]}, \\ \hat A(2)e^{j[\frac{2\pi}{\lambda}(x_i\sin\theta_2 + y_i\cos\theta_2)+\phi_i]}, \ldots, \\ \hat A(L)e^{j[\frac{2\pi}{\lambda}(x_i\sin\theta_L + y_i\cos\theta_L)+\phi_i]} \end{bmatrix}^T$$

$$\hat A(l) = \frac{1}{M}\sum_{i=1}^M Y_i(l)e^{-j[\frac{2\pi}{\lambda}(x_i\sin\theta_l + y_i\cos\theta_l)+\phi_i]}$$

$$= \frac{1}{M}\left\{\sum_{i=2}^M Y_i(l)e^{-j[\frac{2\pi}{\lambda}(x_i\sin\theta_l + y_i\cos\theta_l)+\phi_i]} + Y_1(l)\right\}$$

Theoretic analyses and simulation experiments indicate that the above-mentioned channel phase calibration method is only applicable to non-linear arrays and at least two single-azimuth echoes, which have angle differences other than 0° or 180°, must be available. The channel phase mismatch estimation is actually a multidimensional parameter estimation problem and may be obtained via multidimensional searching since it relates to all array elements and therefore the selection of optimization methods. Due to the existence of local minimum, global optimization methods (Referring to the paper "From Local Minimum to Global optimization" by Tang F and Wang L, Computer Engineering and Applications, 2002.6: 56-58) must be used to estimate the channel phase mismatches. However, the methods cannot meet a real-time requirement for a very heavy computing load as there are too many parameters (more than 100). The invention employs special processing to reduce the computing load, which is explained in detail below.

Figure 5:
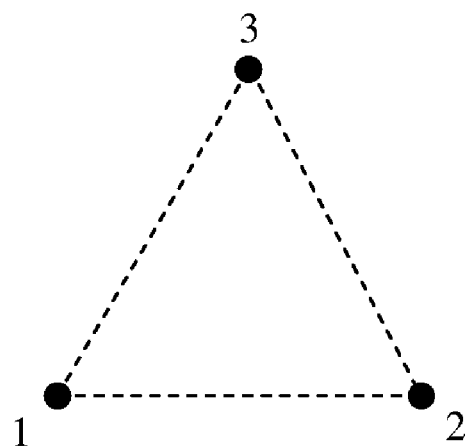
FIG. 5 is a schematic diagram of a triangular array.

FIG. 5 illustrates a simplest non-linear array, which is a triangular array constituted by three array elements not lying on the same straight line. If the channel phase mismatch coefficients of the triangular array and the arrival angles of single-azimuth echoes are estimated by three single-azimuth echoes only, a 5-dimension searching can be judged from equation (6) (a certain array element as the reference channel). Since few dimensions are involved, even the global optimization methods such as simulated annealing, evolution computing, chaos searching and random sampling are used, the computing load of the 5-dimension searching is not heavy, and therefore the real-time requirement can be met.

For the M-element random non-linear array as shown in FIG. 4, a certain triangular array included therein can be used to implement pre-estimation of initial values of the parameters to be estimated, and then local optimization methods (e.g., steepest descent method) can be used to obtain more precise estimates, so as to reduce the computing load of multi-dimension parameter estimation. Detailed steps are:

1) Choosing three array elements to form a triangular array, and three single-azimuth echoes for parameter estimation from a large number of ones;
2) Using a certain array element of the triangular array as the reference channel, and estimating the phase mismatch coefficients of other two channels and the arrival angles of the three single-azimuth echoes via global optimization methods, which is 5-dimension searching;
3) Adding a single-azimuth echo for parameter estimation of the triangular array, therefore, parameters to be estimated in equation (6) are increased by one (i.e. the arrival angle of the newly-added single-azimuth echo), and the 5-dimension searching is changed into 6-dimension searching; estimated values of five parameters obtained in step 2) are substituted into equation (6) including six parameters to be estimated, then the arrival angle of the newly-added single-azimuth echo is estimated via equation (6) which now has only one parameter to be estimated, which is one-dimension searching;
4) Except for the three single-azimuth echoes chosen in step 1), the arrival angle estimation of other L−3 single-azimuth echoes can be obtained by the method in step 3).
5) Using all L single-azimuth echoes for parameter estimation of the triangular array, choosing the obtained estimated values of L+2 parameters (arrival angles of L single-azimuth echoes and two channel phase mismatch coefficients) as initial values, and local optimization methods are used to get more precious estimated values of these parameters.
6) Combining the triangular array with another array element to form a 4-element array and using all L single-azimuth echoes for parameter estimation of the 4-element array, then the number of parameters to be estimated in equation (6) is L+3; the obtained estimated values of L+2 parameters in step 5) are substituted into equation (6), then there is only one parameter to be estimated in equation (6), i.e. the channel phase mismatch coefficient of the newly-added array element, whose estimated value can be obtained via one-dimension searching.
7) Except for the triangular array chosen in step 1), the estimated values of the channel phase mismatch coefficients of other M−3 array elements can be obtained by the method in step 6).
8) Using all L single-azimuth echoes for parameter estimation of the whole M-element array, choosing the obtained estimated values of L+M−1 parameters (arrival angles of L single-azimuth echoes and M−1 channel phase mismatch coefficients) as initial values, and local optimization methods are used to get more precious estimated values of these parameters.

If the pre-estimation errors of initial values of these parameters are not large, the result of local optimization is also the global optimum, while the computing load of local optimization is much smaller than that of global optimization. In fact, the above pre-estimation of initial values takes up most of the calculating time, but it relates to the global optimization of 5-dimension searching at most, and therefore can meet the real-time requirement. These eight steps above are the typical ways of special processing, and can be simplified, enriched, adjusted, or improved for practical application according to the actual situation. The basic idea is to decrease the dimension number of global optimization by the processing for triangular arrays, and to make the most of local optimization methods via the pre-estimation of initial values, so as to decrease the computing load of multi-dimensional parameter estimation.

Figure 6:
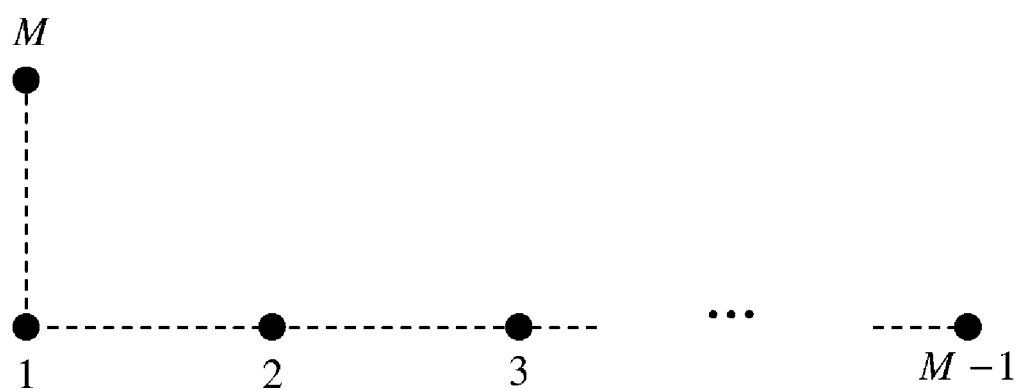
FIG. 6 is a schematic diagram of a M-element L-form array.

FIG. 6 is an M-element L-form array of an embodiment of the invention. Array element 1−M−1 form a uniform linear array, from which more than one combination of translation invariant dual array-element couples for detecting single-azimuth echoes can be divided. Channel amplitude calibration can be realized by equation (3), and channel phase calibration is the key point. A triangular array constituted by the array element 1, 2 and M is used for estimating initial values of parameters, and the channel phase calibration can be implemented by equation (6) and the special processing.

Figure 7:
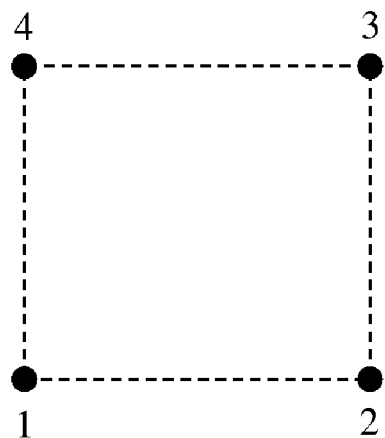
FIG. 7 is a schematic diagram of a 4-element rectangle array.

FIG. 7 is a 4-element rectangular array. In this embodiment, 4 array elements constitute only one combination of translation invariant dual array-element couples for detecting single-azimuth echoes, and a triangular array constituted by any three array elements can be used for estimating initial values of parameters.

Figure 8:
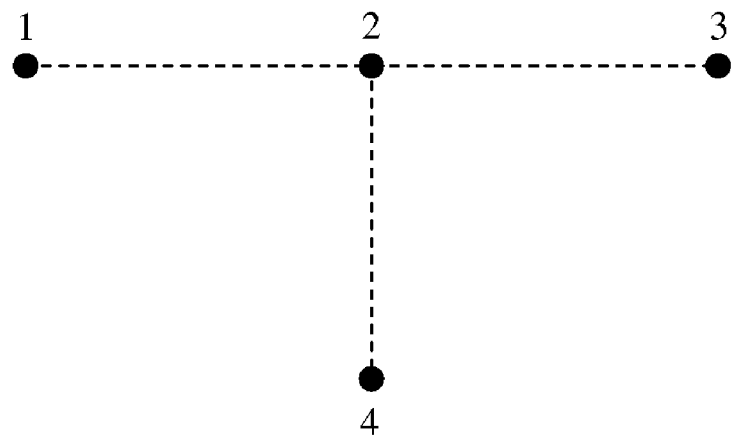
FIG. 8 is a schematic diagram of a 4-element T-form array.

FIG. 8 is a 4-element T-form array. In this embodiment, the array element 1-3 constitute a 3-element uniform linear array, from which only one combination of translation invariant dual array-element couples for detecting single-azimuth echoes can be divided. Both the two triangular arrays constituted by the array element 1, 2, 4 and array element 2, 3, 4 can be used for estimating initial values of parameters.

The channel calibration method described in the invention has gained success in high frequency surface wave radars, however, in essence, the method is possible to be applied to other detection systems or communication systems receiving a large number of single-azimuth signals.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

What is claimed is:

1. A passive channel calibration method based on a non-linear antenna array, comprising:
    setting an antenna array to a non-linear formation that contains at least a combination of translation invariant dual array-element couples;

detecting single-azimuth ocean echoes via said combinations of translation invariant dual array-element couples;

estimating channel amplitude mismatch coefficients via said single-azimuth ocean echoes to implement amplitude calibration; and estimating channel phase mismatch coefficients via said single-azimuth ocean echoes after said amplitude calibration and the known array position information to implement phase calibration.

2. A passive channel calibration method based on a non-linear antenna array, comprising:

setting an antenna array to a non-linear formation that contains at least a combination of translation invariant dual array-element couples;

detecting single-azimuth ocean echoes via said combinations of translation invariant dual array-element couples;

estimating channel amplitude mismatch coefficients via said single-azimuth ocean echoes to implement amplitude calibration; and estimating channel phase mismatch coefficients via said single-azimuth ocean echoes after said amplitude calibration and the known array position information to implement phase calibration, wherein said channel amplitude mismatch coefficients are estimated by said single-azimuth ocean echoes using the equation $$\hat{g}_i = \sqrt{\frac{1}{L}\sum_{l=1}^{L}\frac{|Y_i(l)|^2}{|Y_1(l)|^2}}$$

to implement said amplitude calibration, $\hat{g}_i$ is an estimated value of the channel amplitude mismatch coefficient of array element i;

i=1, 2, ..., M;

M is a number of array elements;

$Y_i(l)$ is an output of the lth single-azimuth echo received by said array element i;

l=1, 2...L, and

L is a number of said single-azimuth echoes.

3. A passive channel calibration method based on a non-linear antenna array, comprising:

setting an antenna array to a non-linear formation that contains at least a combination of translation invariant dual array-element couples;

detecting single-azimuth ocean echoes via said combinations of translation invariant dual array-element couples;

estimating channel amplitude mismatch coefficients via said single-azimuth ocean echoes to implement amplitude calibration; and estimating channel phase mismatch coefficients via said single-azimuth ocean echoes after said amplitude calibration and the known array position information to implement phase calibration, wherein said channel amplitude mismatch coefficients are estimated by said single-azimuth ocean echoes using a equation $$\hat{g}_i = \sqrt{\frac{1}{L}\sum_{l=1}^{L}\frac{|Y_i(l)|^2}{|Y_1(l)|^2}}$$

to implement amplitude Calibration;

$\hat{g}_i$ is an estimated value of the channel amplitude mismatch coefficient of array element i;

i=1, 2, ..., M;

M is a number of array elements;

$Y_i(l)$ being the output of the lth single-azimuth echo received by said array element i, l=1, 2, ..., L, and L is a number of said single-azimuth echoes.

4. A passive channel calibration method based on a non-linear antenna array, comprising:

setting an antenna array to a non-linear formation that contains at least a combination of translation invariant dual array-element couples;

detecting simile-azimuth ocean echoes via said combinations of translation invariant dual array-element couples;

estimating channel amplitude mismatch coefficients via said single-azimuth ocean echoes to implement amplitude calibration; and estimating channel phase mismatch coefficients via said simile-azimuth ocean echoes after said amplitude calibration and the known array position information to implement phase calibration, wherein said channel amplitude mismatch coefficients are estimated by said single-azimuth ocean echoes using a equation $$\hat{g}_i = \sum_{l=1}^{L}|Y_i(l)| \Big/ \sum_{l=1}^{L}|Y_1(l)|$$

to implement amplitude calibration;

$\hat{g}_i$ is an estimated value of the channel amplitude mismatch coefficient of array element i;

i=1, 2, ..., M;

M is a number of array elements;

$Y_i(l)$ is the output of the lth single-azimuth echo received by said array element i, l=1, 2, ..., L, and L is a number of said single-azimuth echoes.

5. A passive channel calibration method based on a non-linear antenna array, comprising:

setting an antenna array to a non-linear formation that contains at least a combination of translation invariant dual array-element couples;

detecting single-azimuth ocean echoes via said combinations of translation invariant dual array-element couples;

estimating channel amplitude mismatch coefficients via said single-azimuth ocean echoes to implement amplitude calibration; and estimating channel phase mismatch coefficients via said single-azimuth ocean echoes after said amplitude calibration and the known array position information to implement phase calibration, wherein said channel amplitude mismatch coefficients are estimated by said single-azimuth ocean echoes using a equation $$\hat{g}_i = \sum_{l=1}^{L}|Y_i(l)| \Big/ \sum_{l=1}^{L}|Y_1(l)|$$

to implement amplitude calibration;

$\hat{g}_i$ is an estimated value of the channel amplitude mismatch coefficient of array element i, i=1, 2, ..., M;

M is a number of array elements;

$Y_i(l)$ is the output of the lth single-azimuth echo received by said array element i, l=1, 2, ... L, and L is a number of said single-azimuth echoes.

6. The method of claim 5, wherein
said channel phase mismatch coefficients are estimated by said single-azimuth ocean echoes after said amplitude calibration and the known array position information from $$\hat{\Psi} = \arg\min_{\Psi} \|Y - f'(\Psi)\|^2$$

to implement phase calibration;

$$\Psi = [\theta_1, \theta_2, \cdots, \theta_L, \phi_2, \phi_3, \cdots, \phi_M]^T;$$

$$Y = \begin{bmatrix} Y_2 \\ Y_3 \\ \vdots \\ Y_M \end{bmatrix};$$

$$Y_i = [Y_i(1), Y_i(2), \cdots, Y_i(L)]^T;$$

$$f'(\Psi) = \begin{bmatrix} f_2'(\Psi) \\ f_3'(\Psi) \\ \vdots \\ f_M'(\Psi) \end{bmatrix};$$

$$f_i'(\Psi) = \left[ Y_1(1) e^{j\left[\frac{2\pi}{\lambda}(x_i\sin\theta_1 + y_i\cos\theta_1) + \phi_i\right]}, \right.$$
$$Y_1(2) e^{j\left[\frac{2\pi}{\lambda}(x_i\sin\theta_2 + y_i\cos\theta_2) + \phi_i\right]}, \cdots,$$
$$\left. Y_1(L) e^{j\left[\frac{2\pi}{\lambda}(x_i\sin\theta_L + y_i\cos\theta_L) + \phi_i\right]} \right]^T$$

$\theta_l$ is the arrival angle of the lth single-azimuth echo;
$\Phi_i$ is the channel phase mismatch coefficient of array element i;
$(x_i, y_i)$ is the array element position coordinates, and array element 1 is the origin of coordinates, i.e., $(x_1, y_1)=(0,0)$;
$\lambda$ is the echo signal wavelength; and
$\hat{\Psi}$ is the estimated value of $\Psi$.

7. The method of claim 6, wherein
three array elements are selected from all array elements to form a triangular array;
said triangular array is utilized by the processes to decrease the dimension number of global optimization; and
said channel phase mismatch coefficients are estimated via pre-estimation of initial values and local optimization methods.

8. The method of claim 5, wherein
said channel phase mismatch coefficients are estimated by said single-azimuth ocean echoes after said amplitude calibration and the known array position information from $$\hat{\Psi} = \arg\min_{\Psi} \|Y - \tilde{f}(\Psi)\|^2$$

to implement phase calibration;

$$\Psi = [\theta_1, \theta_2, \cdots, \theta_L, \phi_2, \phi_3, \cdots, \phi_M]^T;$$

$$Y = \begin{bmatrix} Y_2 \\ Y_3 \\ \vdots \\ Y_M \end{bmatrix};$$

$$Y_i = [Y_i(1), Y_i(2), \cdots, Y_i(L)]^T;$$

$$\tilde{f}(\Psi) = \begin{bmatrix} \tilde{f}_2(\Psi) \\ \tilde{f}_3(\Psi) \\ \vdots \\ \tilde{f}_M(\Psi) \end{bmatrix};$$

$$\tilde{f}_i(\Psi) = \left[ \hat{A}(1) e^{j\left[\frac{2\pi}{\lambda}(x_i\sin\theta_1 + y_i\cos\theta_1) + \phi_i\right]}, \right.$$
$$\hat{A}(2) e^{j\left[\frac{2\pi}{\lambda}(x_i\sin\theta_2 + y_i\cos\theta_2) + \phi_i\right]}, \cdots,$$
$$\left. \hat{A}(L) e^{j\left[\frac{2\pi}{\lambda}(x_i\sin\theta_L + y_i\cos\theta_L) + \phi_i\right]} \right]^T;$$

$$\hat{A}(l) = \frac{1}{M} \sum_{i=1}^{M} Y_i(l) e^{-j\left[\frac{2\pi}{\lambda}(x_i\sin\theta_l + y_i\cos\theta_l) + \phi_i\right]}$$
$$= \frac{1}{M}\left\{ \sum_{i=2}^{M} Y_i(l) e^{-j\left[\frac{2\pi}{\lambda}(x_i\sin\theta_l + y_i\cos\theta_l) + \phi_i\right]} + Y_1(l) \right\};$$

$\theta_l$ is the arrival angle of the lth single-azimuth echo;
$\Phi_i$ is the channel phase mismatch coefficient of array element i;
$(x_i, y_i)$ is the array element position coordinates, and array element 1 is the origin of coordinates, i.e., $(x_1, y_1)=(0,0)$;
$\lambda$ is the echo signal wavelength; and
$\hat{\Psi}$ is the estimated value of $\Psi$.

9. The method of claim 8, wherein
three array elements are selected from all array elements to form a triangular array;
said triangular array is utilized by the processes to decrease the dimension number of global optimization; and
said channel phase mismatch coefficients are estimated via pre-estimation of initial values and local optimization methods.

10. The method of claim 9, comprising
1) selecting three array elements to form a triangular array, along with three single-azimuth echoes for parameter estimation;
2) choosing any element of said triangular array as a reference channel and estimating the phase mismatch coefficients of other two channels and the arrival angles of three single-azimuth echoes via global optimization methods;
3) adding a single-azimuth echo for parameter estimation of said triangular array, and thus obtaining its arrival angle;
4) obtaining arrival angles of other single-azimuth echoes according to step 3);
5) combining said triangular array with another array element to form a 4-element array, and using all single-azimuth echoes for parameter estimation of said 4-element array, so as to obtain the channel phase mismatch coefficient of the newly-added array element; and
6) obtaining channel phase mismatch coefficients of other array elements according to step 5).

11. The method of claim 10, wherein after step 4) and before step 5), using all said single-azimuth echoes for parameter estimation of said triangular array, and regarding the obtained estimated values of said arrival angles of said single-azimuth echoes and said channel phase mismatch coefficients as initial values, obtaining more accurately estimated values of these parameters via said local optimization methods.

12. The method of claim 10, wherein after step 6), using all said single-azimuth echoes for parameter estimation of the whole array, and regarding the obtained estimated values of said arrival angles of said single-azimuth echoes and said channel phase mismatch coefficients as initial values, obtaining more accurately estimated values of these parameters via said local optimization methods.

13. The method of claim 10, wherein for an M-element L-form array, array element 1, 2 and M are used for parameter estimation as a triangular array selected in step 1), so as to implement channel phase calibration.

14. The method of claim 10, wherein for a 4-element L-form array, array element 1, 2, 4 or array element 2, 3, 4 are used for parameter estimation as a triangular array selected in step 1), so as to implement channel phase calibration.

15. The method of claim 10, wherein for a 4-element rectangular array, any three array elements are used for parameter estimation as a triangular array selected in step 1), so as to implement channel phase calibration.

16. The method of claim 1, comprising
said estimating channel amplitude mismatch coefficients via single-azimuth ocean echoes having unknown direction to implement amplitude calibration; and
said estimating channel phase mismatch coefficients via said single-azimuth ocean echoes having unknown direction after said amplitude calibration and the known array position information to implement phase calibration.

17. The method of claim 1, wherein said single-azimuth ocean echoes have unknown direction.

18. The method of claim 1, wherein said non-linear formation of said antenna array comprises unconnected elements that do not lie on a straight line.

19. The method of claim 1, wherein said estimating channel phase mismatch coefficients does not comprise using any auxiliary signal sources.

20. The method of claim 19, wherein said method is a passive channel calibration method comprising direct estimation of channel phase mismatch coefficients from measured data and array format information.

* * * * *